United States Patent [19]

Gray

[11] Patent Number: 4,688,022

[45] Date of Patent: Aug. 18, 1987

[54] SAFETY DEVICE FOR HANG GLIDER

[76] Inventor: John R. Gray, 3009 Cyrandall Valley Rd., Oakton, Va. 22124

[21] Appl. No.: 826,741

[22] Filed: Feb. 6, 1986

[51] Int. Cl.⁴ .................... G08B 21/00; B64D 17/00
[52] U.S. Cl. .................................. 340/540; 340/573; 340/572; 340/686; 244/4 A; 244/143; 244/152; 244/904
[58] Field of Search ............... 340/540, 522, 571, 572, 340/573, 686, 687; 244/DIG. 1.1–1.5, 904, 152, 4 A, 143

[56] References Cited

U.S. PATENT DOCUMENTS 4,248,394 2/1981 Klumpp ................. 244/DIG. 1.4
4,272,039 6/1981 Hollingsworth ................ 244/904

Primary Examiner—Donnie L. Crosland
Attorney, Agent, or Firm—Roland H. Shubert

[57] ABSTRACT

A safety device to warn the pilot of a hang glider if take-off is attempted without the glider hook-up strap being connected to the pilot's harness includes two sensors arranged in series with an alarm. One of the sensors is arranged to close a circuit when the glider is positioned in a take-off attitude and the other sensor closes a circuit when the free end of the hook-up strap is disconnected from the pilot's harness. The alarm is activated when both circuits are closed.

20 Claims, 6 Drawing Figures

SAFETY DEVICE FOR HANG GLIDER

BACKGROUND OF THE INVENTION

This invention relates generally to a safety device for a hang glider.

More specifically, this invention relates to an alarm device which warns a pilot of danger if he attempts a take off without being properly hooked in to the glider.

A significant number of hang gliding accidents resulting in fatalities are due to glider pilots taking off from a cliff or other high point without attaching their harnesses to their gliders. In 1983 there were eleven deaths, approximately 20% of all hang glider fatalities that year, due to a failure of the pilot to hook-in to his glider. There were an additional number of serious injuries caused by that same error.

Hang glider pilots, as a group, are well aware of these dangers and have instituted "hang-check" procedures in which at least one other person physically verifies that the pilot is properly attached to the glider. In an additional check, the pilot will put his weight on the harness to assure that he is hooked in. Yet, in spite of these precautions, accidents continue to occur. Pilots may simply forget or ignore established procedures. A pilot may be flying alone and have no one else to perform a hang check. He may perform a hang check and later may unhook to adjust a strap or give another pilot a hang check and then forget to hook back in and have another hang check.

Other than hang check procedures, there is nothing that is observable by the pilot to warn him that he is not properly hooked in and is in danger. As he prepares for take-off, the weight of the glider is on his shoulders and his hook-up strap is slack. The strap is behind him, being attached to his harness in the middle of his back, so he has no visual clue that he is, or is not, hooked in. In a cliff take off, the pilot runs a short distance and literally steps off into space as he and his glider become airborne. This short take-off run does not give time for the pilot to feel the glider begin to lift his weight (or not lift his weight) before he is over the cliff edge. Faced with this situation, most pilots are so surprised that they lose their grip and fall almost immediately. Others manage to hang on for a short time. A lucky, and strong, few have managed to hang on, control their glider, and survive.

Some hang gliders have been equipped with wind direction indicator flags, attached to the nose of the glider with the words "HOOK-IN" printed on the flag. Such reminders may be of some use to the novice but routine written warnings of whatever kind tend to be ignored after a short time. A number of quite specific characteristics would be required for an alarm warning of a failure to hook-in to be effective and yet acceptable to hang glider pilots. It would have to have a low false alarm rate else it would be either removed or disabled. It necessarily would have to be light and of rugged construction and present low wind drag so as to have a negligible effect on glider performance. It should be difficult to "cheat" on and be detectable by others around the hang glider as well as by the pilot. It would desirably be relatively inexpensive, be simple to maintain and operate and be adaptable for use with virtually all of the different varieties of hang gliders. Finally, it should not be offensive to the self image of the hang glider pilot.

It is evident that a warning device meeting the above criteria would be of great potential benefit to the sport of hang gliding.

SUMMARY OF THE INVENTION

An alarm device is provided which warns a hang glider pilot of danger if a take-off is attempted without the pilot being properly hooked in to the glider. The device includes two sensors in series arrangement in an alarm circuit. One of the sensors is attached to the keel of the glider and is activated when the glider is positioned in a take-off attitude; that is with wings horizontal and nose in a level or slightly tilted position. The other sensor is positioned at the end of the hook-up strap and may comprise a switch which is arranged to be in a closed position when the hook-up strap is hanging slack unattached to the pilot's harness. An alarm, peferably a buzzer or other sound alarm, is sounded when the two sensors are simultaneously activated.

Hence, it is an object of this invention to provide a safety device for a hang glider.

It is another object of this invention to provide an alarm which will sound if a hang glider is positioned for take-off without the hook-up strap being attached to a pilot's harness and to a method for its use.

Other objects of the invention will be apparent from the following description of certain preferred embodiments.

BRIEF DESCRIPTION OF THE DRAWING

Specific embodiments of the invention are illustrated in the drawing in which.

DESCRIPTION AND DISCUSSION OF THE INVENTION

Figure 1:
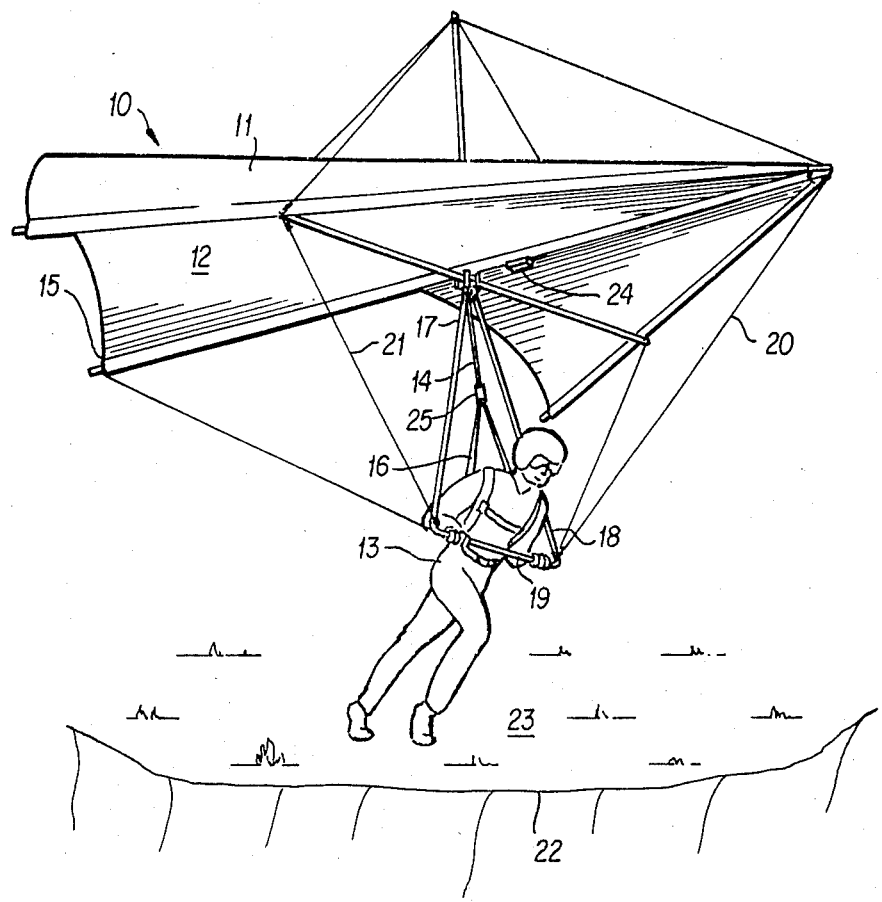
FIG. 1 is a depiction of a hang glider and its pilot at the time of take-off and showing the position of alarm device components of this invention.

The invention will be generally described by reference to FIG. 1 in which there is shown a hang glider 10 in the act of take-off. The hang glider includes a wing or air foil 11 bisected by a keel member 12. A hang glider pilot 13 is secured to glider 10 by means of a hook-up strap 14 extending from the approximate center of lift 15 along the glider keel and attached to a harness 16 about the upper portion of the pilot's body. Also attached to the glider keel is a triangular control bar assembly comprising a pair of downtubes 17 and 18 spaced apart at their lower ends by cross bar 19. The control bar assembly is held in a position perpendicular to the plane of the air foil 11 by means of a plurality of guy wires extending between the lower ends of downtubes 17 and 18 and various points on the air foil. Two of these guy wires, 20 and 21, are illustrated.

During the take-off procedure, the pilot positions himself with the downtubes 17 and 18 resting on his shoulders and grasps one of the downtubes with each hand as shown. In this position, the hook-up strap 14 is slack and carries no weight. Also, the air foil 11 assumes a horizontal attitude with the nose of the glider level or tilted slightly upward. The take-off run carries the glider and pilot over the edge 22 of cliff 23 at which time the lift of the glider supports the pilot through the now taut hook-up strap 14. After becoming airborne, the pilot shifts his hand grip to crossbar 19 and controls the glider by shifting his weight left and right and forward and backward relative to the crossbar.

Figure 4:
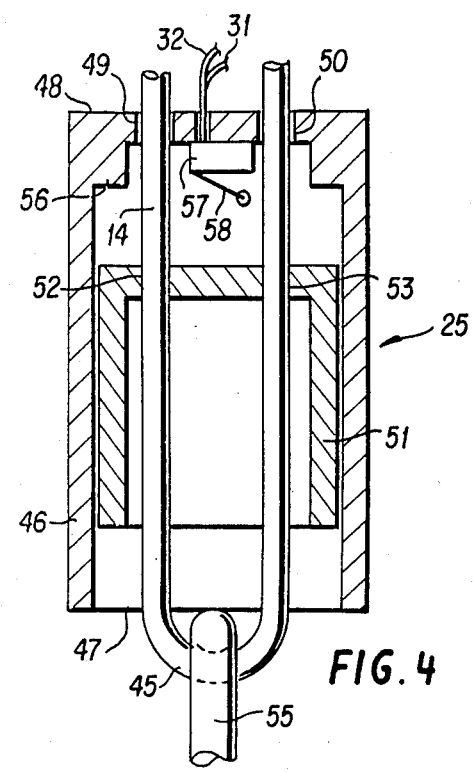
FIG. 4 shows the switch of FIG. 3 in a detached, or activated position.
Figure 5:
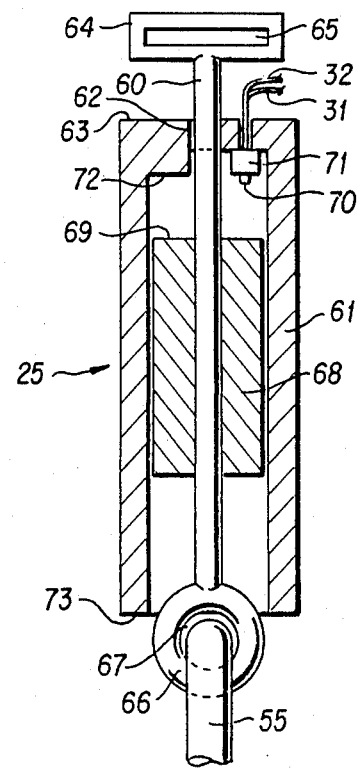
FIG. 5 illustrates another embodiment of the hook-up sensor switch.

As can now be appreciated, two conditions exist simultaneously as the pilot positions himself for take-off and begins his take-off run. First, the glider body is essentially level and horizontal. Second, the hook-up strap connecting glider to pilot hangs loose and slack as the glider weight is carried on the pilot's shoulders. The safety device of this invention senses the glider attitude; whether or not the glider body is level and horizontal. This is accomplished by means of a position sensor 24, such as a mercury sensor switch, mounted on the glider keel preferably at a point just forward of the hook-up strap mounting. A second sensor is arranged in series fashion with position sensor 24. This second sensor 25 is positioned at the lower, or harness attachment end, of hook-up strap 14 and is held in an open, or deactivated, state when the carbiner used to link the pilot's harness 16 to hook-up strap 14 is in place. Sensor 25, in a preferred embodiment, comprises a slide switch arrangement as is illustrated in FIGS. 3-5.

Figure 2:
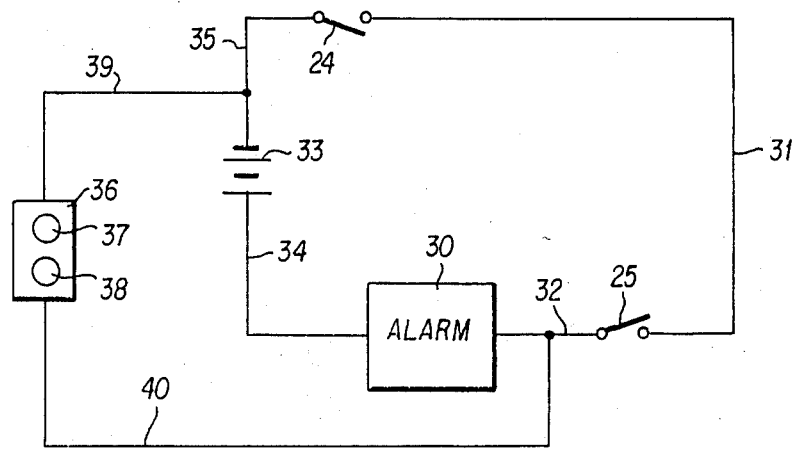
FIG. 2 is a schematic circuit diagram of the alarm device.

An alarm, preferably mounted on the glider keel in association with sensor 24, is arranged to sound in the event that the glider is positioned in a take-off attitude, that is level and horizontal, while at the same time the end of hook-up strap 14 is not connected through a carabiner or similar link to the pilot's harness. The arrangement of the alarm circuit is illustrated in FIG. 2. The circuit includes an alarm 30, preferably an audio alarm, which sounds to alert a glider pilot to an unsafe condition. Position sensor 24, depicted here as an open switch, is connected through conductor 31 in series with second sensor 25 which preferably comprises a slide activated switch as will be described later. Sensor 25 is connected to alarm 30 through conductor 32 while the other side of the alarm is connected to a power supply 33, suitably a battery pack, by means of conductor 34. The circuit is completed by conductor 35 which connects power supply 33 to one pole of sensor 24. Provision may be made for test of the the power supply 33, as well as the functioning of the alarm 30, by means of a test circuit. The test circuit suitably may comprise test means 36 having a test switch 37 and circuit condition indicator 38 connected to the alarm circuit by means of conductors 39 and 40 so as to include the alarm 30 and power supply 33 within the test circuit.

Figure 3:
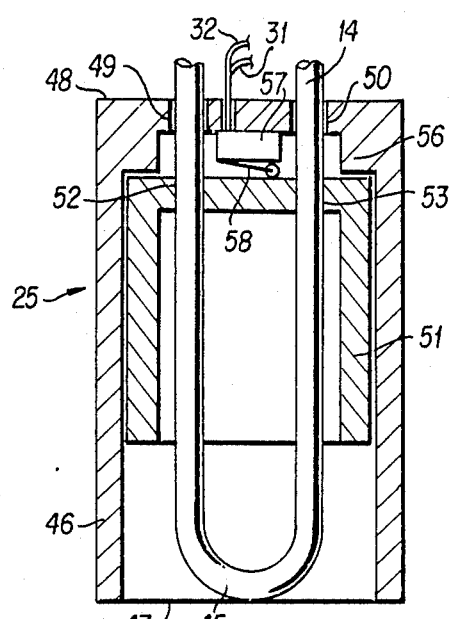
FIG. 3 is a partial sectional view of the hook-up sensor switch in an attached position.

Turning now to FIG. 3, there is shown in section one embodiment of the slide switch sensor 25. In this embodiment, hook-up strap 14 comprises a doubled length of rope arranged to form a loop at its lower or free end 45. Nylon climbing rope of about ⅜ inch diameter is well suited for use as the hook-up strap in this embodiment. There is provided a sensor housing 46 having an open end 47 opposite a closed end 48. Closed end 48 is provided with a pair of rope ports, 49 and 50, through which the hook-up strap or rope 14 passes to form loop 45. Ports 49 and 50 are sized relative to rope 14 so as to allow housing 46 to slide freely up and down along the rope loop. Housing 46 is conveniently of cylindrical cup shape but may be polygonal in cross-section.

Disposed within housing 46 is slide block 51 which is of a size and shape allowing it to move freely within the interior of housing 46. Slide block 51 may conveniently be formed in the shape of an inverted cup with the loops of hook-up rope 14 passing through holes or ports 52 and 53 thereof. The fit of rope 14 in ports 52 and 53 is such that slide block 51 is secured to and moves with the rope. Alternatively, hook-up rope 14 may be secured to the slide block 51 by use of adhesives or clamping means.

Referring now to FIG. 4 in conjunction with FIG. 3, there is illustrated the operation of sensor 25. FIG. 3 shows sensor 25 with the hook-up rope 14 in a free, or unattached position while FIG. 4 shows the position of sensor 25 with the loop of hook-up rope 14 attached to a carbiner 55 which links rope 14 to the harness worn by the glider pilot. As shown in FIG. 3, when the hook-up rope 14 is in an unattached or free position, sensor housing 46 slides downwardly along the rope loop until the top of slide block 51 contacts ledge member 46 which may be formed as an integral interior part of housing 46. An on-off type electrical switch 57 is mounted at a location within the sensor whereat it is activated by means of toggle arm 58 when housing 46 slides downwardly to its extreme position as shown. Ledge member 56 is proportioned so as to allow the toggle arm 58 of switch 57 to close the switch as slide block 51 approaches and contacts ledge 56 but the ledge also acts to prevent slide block 51 from applying pressure to and possibly damaging the body of switch 57. Switch 57 is advantageously secured to the underside of housing end 48 at a location between rope ports 49 and 50. Provision is made for extending elecrical leads 31 and 32 (see FIG. 2) through the housing end for connection with the alarm circuit.

FIG. 4 shows the position assumed by sensor 25 when hook-up rope 14 is connected to the harness of the glider pilot through carbiner 55. The diameter of the open end 47 of housing 46 is large enough to allow the loop 45 of hook-up rope 14 to freely move in and out of the housing but small enough so that carabiner 55 cannot enter. Consequently, when the pilot's harness is attached to the hook-up rope 14 through carabiner 55, housing 46 is prevented from sliding downwardly and causing toggle arm 58 to close switch 57.

Referring now to FIG. 5, there is shown another embodiment of slide switch sensor 25. In this embodiment, there is provided a connecting rod 60 which is axially disposed within generally cylindrical housing 61. Rod 60 extends through port 62 at the center closed end 63 of housing 61 and is freely slidable up and down through that port. The top end 64 of rod 60 may be provided with a horizontally extending slot 65 adapted to accept passage of a web-type hook-up strap for connection of sensor 25 to the glider keel. Alternatively, top end 64 may be formed as a closed loop adapted for connection to a rope rather than to a strap. The closed loop may be similar to loop 66 formed at the lower end of connecting rod 60. The exterior of loop 66 is sized sufficiently small so as to freely enter the interior of housing 61 while the eye 67 of the loop is sized to freely accept carabiner 55 which links hook-up strap 14 to the pilot's harness through slide sensor 25.

A slide block 68 is centered around and securely attached to connecting rod 60. Slide block 68 may be generally cylindrical in shape and is proportioned so as to allow free up and down movement within the interior of housing 61. Top surface 69 of slide block 68 is preferably flat so as to engage and activate trigger means 70, which may be a toggle arm, of switch 71. Switch 71 may be similar or identical to switch 57 of the FIG. 3 embodiment. There is also provided a ledge or stop member 72 positioned within housing 61 opposite to switch 71 to limit the travel of connecting rod 60 and its attached slide block 68 so as to protect the switch. Electrical leads 31 and 32 extend through the end 63 of housing 61 for connection with the alarm circuit as previously described.

Figure 6:
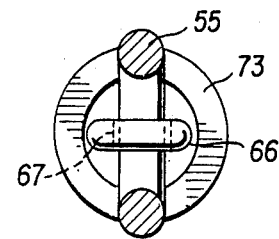
FIG. 6 is a bottom view of the sensor switch linked to a carbiner.

There is shown in FIG. 6 a bottom view of sensor 25 representative generally of the embodiments both of FIG. 3 and FIG. 5. Describing FIG. 6 in relation to FIG. 5, there is shown the bottom edge 73 of cylindrical housing 61. Carabiner 55 is inserted through eye 67 of loop 66. As is shown in the drawing, loop 66 is sized so that it can freely enter the interior of housing 61. Carabiner 55, on the other hand, is sufficiently large as to preclude its entry into housing 61.

As can be appreciated, sensors 24 and 25 work in combination to provide an alarm when, and only when, the glider is positioned in a take-off attitude and the hook-up strap is disconnected from the pilot's harness. Thus, the number of false alarms is cut substantially to zero while the pilot is reliably warned in the event he positions himself for launch without being properly hooked-up to the glider.

It is evident that various modifications, alternative construction techniques and equivalents to elements of the preferred embodiments disclosed may be employed without departing from the spirit and scope of the invention as is defined by the appended claims.

What is claimed is:

1. An alarm device for a hang glider, said glider having a keel and having a hook-up strap attached to said keel, said hook-up strap having a free end adapted for connection to the harness of a glider pilot, comprising:
   a position sensor mounted to the keel of said glider, said sensor adapted to complete an electrical circuit when the glider is positioned in a take-off attitude;
   a second sensor arranged in series with said position sensor, said second sensor adapted to complete an electrical circuit when the free end of said hook-up strap is disconnected from the harness of said glider pilot; and
   alarm means adapted to alert the pilot upon completion of an electrical circuit by both said position sensor and said second sensor.

2. The alarm device of claim 1 wherein said position sensor comprises a mercury sensor switch.

3. The alarm device of claim 1 wherein the free end of said hook-up strap comprises a loop adapted for insertion of a carabiner for attachment to the harness of said pilot.

4. The alarm device of claim 3 wherein said second sensor comprises a housing member freely slidable on said hook-up strap, said housing member cooperating with a slide block fixed to the hook-up strap near the free end thereof to close an electrical switch when said carabiner is not inserted within said loop.

5. The device of claim 4 wherein said housing member is of generally cylindrical shape having a closed upper end through which said hook-up strap passes and an open lower end.

6. The device of claim 5 wherein said open lower end is sized large enough to allow entry of said loop within the interior of said housing but small enough to preclude entry of said carabiner.

7. The device of claim 6 wherein said electrical switch is mounted on the underside of said housing end within said housing and wherein a switch activating lever is arranged to interact with said slide block as the slide block approaches said housing end.

8. The device of claim 1 wherein said alarm means comprises an audio alarm.

9. The device of claim 8 wherein said audio alarm is powered by a battery pack and wherein said position sensor, audio alarm and battery pack are mounted on the glider keel forward of the connection of said hook-up strap to the keel.

10. A method for alerting the pilot of a hang glider to a condition making take-off unsafe, comprising:
    sensing the attitude of the glider and closing a first electrical circuit when the glider is positioned for take-off;
    sensing the condition of the link between a hook-up strap extending from a point on the keel of said glider to a harness worn by the pilot of said glider and closing a second electrical circuit when said hook-up strap is disconnected from said harness; and
    providing an alarm adapted to alert the pilot when both said electrical circuits are closed.

11. The method of claim 10 wherein the attitude of said glider is sensed by a mercury sensor switch mounted on the keel of said glider.

12. The method of claim 10 wherein said alarm is an audio alarm.

13. The method of claim 10 wherein the condition of said link is sensed by holding a switch in an open position when said hook-up strap is connected to said harness and closing said switch when the hook-up strap is disconnected from the harness.

14. A device for sensing whether the free end of a tethered flexible connecting member is attached to another object through a link, comprising:
    a loop at the free end of said connecting member;
    a housing freely slidable up and down along said connecting member above said loop, said housing having an open lower end adapted to allow entry of said loop into the open lower end of said housing but sized so as to preclude entry of said link into said housing;
    a slide block secured to said connecting member at a point above said loop, said slide block adapted to fit within said housing and proportioned relative to said housing so as to allow free movement of said slide block up and down within said housing; and
    a switch disposed within said housing, said switch arranged to be activated by movement of said slide block relative to said housing when said loop is positioned within the lower end of said housing and deactivated when said loop is external to said housing.

15. The device of claim 14 wherein said flexible connecting member comprises a rope and wherein said rope is doubled back on itself to form said loop.

16. The device of claim 14 wherein said housing is of generally cylindrical shape having an open lower end and a closed upper end, said upper end having a pair of ports through which said rope loop passes.

17. The device of claim 16 wherein said switch is mounted on the underside of said housing end wherein a switch activating lever is arranged to interact with said slide block as the slide block approaches the housing end.

18. The device of claim 17 including stop means disposed on the underside of said housing end and arranged to allow said slide block to engage said switch activating lever but to prevent said slide block from applying force to the body of said switch.

19. The device of claim 14 wherein said flexible connecting member terminates in a connecting rod, said connecting rod having a closed loop at its lower end for attachment to a carabiner, and wherein said housing is arranged to be freely slidable up and down said connecting rod.

20. The device of claim 19 wherein said housing comprises an elongated cylinder open at its lower end with said connecting rod axially disposed therein, the internal diameter of said housing being large enough to allow entry of said closed loop but small enough to preclude entry of said carabiner.

* * * * *